US012402008B2

(12) United States Patent
Huggins et al.

(10) Patent No.: US 12,402,008 B2
(45) Date of Patent: Aug. 26, 2025

(54) ARTIFICIAL INTELLIGENCE-BASED SYSTEM FOR AUTHENTICATING A RESOURCE EXCHANGE EVENT BASED ON GEOLOCATION OF A CARDED OR WEARABLE DEVICE

(71) Applicant: BANK OF AMERICA CORPORATION, Charlotte, NC (US)

(72) Inventors: Robert Nyeland Huggins, Charlotte, NC (US); Katherine Kei-Zen Dintenfass, Lincoln, RI (US); Karen Lea MacQueen, Lyndhurst, OH (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 317 days.

(21) Appl. No.: 17/885,202

(22) Filed: Aug. 10, 2022

(65) Prior Publication Data
US 2024/0056820 A1    Feb. 15, 2024

(51) Int. Cl.
*H04W 12/47* (2021.01)
*H04W 12/06* (2021.01)
*H04W 12/63* (2021.01)

(52) U.S. Cl.
CPC .......... *H04W 12/47* (2021.01); *H04W 12/06* (2013.01); *H04W 12/63* (2021.01)

(58) Field of Classification Search
CPC ...... H04W 12/47; H04W 12/63; H04W 12/06
See application file for complete search history.

(56) References Cited

U.S. PATENT DOCUMENTS

| | | | | |
|---|---|---|---|---|
| 2009/0061863 A1* | 3/2009 | Huggett | ............... | H04L 63/101 455/434 |
| 2014/0065997 A1* | 3/2014 | Walker | ................ | H04W 4/90 455/404.1 |
| 2022/0027812 A1* | 1/2022 | Bahjat | ............... | G06Q 30/0645 |
| 2022/0101378 A1* | 3/2022 | Manfield | ............ | G06Q 30/0269 |
| 2023/0138797 A1* | 5/2023 | Kurian | ................... | G06F 21/31 713/193 |
| 2023/0254663 A1* | 8/2023 | Gupta | ................... | H04W 4/029 455/456.3 |
| 2023/0269091 A1* | 8/2023 | Schreck | ................ | H04L 9/0825 713/168 |
| 2023/0305884 A1* | 9/2023 | Dimitrov | ............... | G06F 9/5077 |
| 2023/0306128 A1* | 9/2023 | Schreck | .............. | G06F 21/6227 |
| 2023/0316280 A1* | 10/2023 | Sardari | ............. | G06Q 20/4015 705/64 |
| 2023/0336468 A1* | 10/2023 | Christa | ................... | H04L 45/42 |
| 2023/0418921 A1* | 12/2023 | Safary | .................... | G06F 21/33 |

* cited by examiner

*Primary Examiner* — Yonas A Bayou
(74) *Attorney, Agent, or Firm* — Moore & Van Allen PLLC; Anup Iyer (57) ABSTRACT

Resource exchange event authentication predicated on user location that is determined from short-range wireless signals transmitted from a card or wearable device in possession of the user. Artificial Intelligence (AI), including Machine Learning (ML) techniques are relied on to determine an authentication rule and/or parameters for an authentication rule as part of the authentication process. Thus, at least a portion of the authentication rules and/or parameters, which may be based not only on the aforementioned determined location of the user, but also on other factors such as time, amount of resource exchange event, type of objects/services being exchanged in the event and the like, are determined intelligently and dynamically at the time that the resource exchange event occurs.

20 Claims, 4 Drawing Sheets

ARTIFICIAL INTELLIGENCE-BASED SYSTEM FOR AUTHENTICATING A RESOURCE EXCHANGE EVENT BASED ON GEOLOCATION OF A CARDED OR WEARABLE DEVICE

FIELD OF THE INVENTION

The present invention is related authentication of resource exchange events and, more specifically, implementing artificial intelligence to determine authentication rules and/or parameters for rules including rules based on the current location of a card device or wearable device and applying the rules to authenticate a resource exchange event.

BACKGROUND

Typically, when location is used as a determinative factor in resource exchange event authentication, the location attributes are received from signals emanating from a user's mobile communication device. However, there may be instances in which a user does not have access to or otherwise possess a mobile communication device (i.e., a device that provides for Internet and/or cellular network connectivity and, thus, allows for location determination using a global positioning system (GPS) mechanism or the like).

Furthermore, when location or other factors are the basis for rules governing the authentication of resource exchange event, the rules and the parameters associated with such rules are typically predefined either by user (i.e., participant in the resource exchange event) or by a third-party (i.e., the resource holding entity or a guardian of the participant in the resource exchange event). The predefined nature of the rules and parameters does not take into account the dynamic circumstances that may be occurring at the time of the resource exchange event.

Therefore, a need exists to develop systems, computer-implemented method, computer program products and the like that will provide resource exchange event authentication to occur based factors including a user's location, in which the location of the user is determined from signals emanating from devices other than a mobile communication devices (i.e., devices that do not have Internet and/or cellular network connectivity). Furthermore, a need exists to develop systems, computer-implemented method, computer program products and the like that will provide resource exchange event authentication based on rules and or parameters associated with the rules that take into account the current circumstances that are occurring at the time of a resource exchange event and, thus, are not just predefined in advance of the resource exchange event.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a highly secure and simplistic means for resource exchange event authentication. The authentication procedure is predicated on user location that is determined from short-range wireless signals transmitted from a card or wearable device in possession of the user. As such the card or wearable device (e.g., bracelet or the like) is equipped with one or more short-range wireless components, such as Radio Frequency Identification (RFID), Zigbee®, Bluetooth®, Bluetooth® Low Energy (BLE) components or the like. In this regard, the card or wearable device is not required to have Intranet or cellular network capabilities, as would be the case if the location were determined using GPS signals. Furthermore, since at least some of the contemplated embodiments envision a card or wearable device with limited battery functionality, the device will be relatively low cost. Moreover, the card device or wearable device may include a memory that stores the user's resource exchange event credentials, such that the card device or wearable device serves as the instrument for initiating the resource exchange event.

Specific use cases center around the user being a minor or some other individual that does not possess a smart phone or other device with Intranet or cellular capabilities. In such embodiments of the invention, the authentication of the resource exchange event may be at least partially based on the user's location (e.g., minor's location or the like) being within a predetermined or dynamically determined distance of a third-party entity's location (e.g., guardian/parent's location or the like).

Moreover, embodiments of the present invention rely on Artificial Intelligence (AI), including Machine Learning (ML) techniques to determine at least one of an authentication rule or parameters for an authentication rule as part of the authentication process. In this regard, authentication rules or parameters (e.g., thresholds or the like), which may be based not only on the location of the user, but also on other factors such as time, amount of resource exchange event, type of objects/services being exchanged in the event and the like, may be determined intelligently and dynamically at the time that the resource exchange event occurs. The AI may rely on historical rules that were either defined by the user, defined by a third-party associated with the user (e.g., guardian or the like) or determined by the AI for previous resource exchange events conducted by the user.

A system for authenticating a resource exchange event defines first embodiments of the invention. The system includes a card device or wearable device in possession of a user. The card device or wearable device includes a short-range wireless communication component that is configured to transmit signals for determining a location of the card device or wearable device. The system additionally includes a computing platform having a memory and one or more computing processor devices in communication with the memory. The memory stores resource exchange event authentication instructions that are executable by at least one of the one or more computing processing devices. The instructions are configured to receive a first signal that requests processing of a resource exchange event initiated by the user and determine a current location of the card device or wearable device based on the signals transmitted by the short-range wireless communication component. The instructions are further configured to implement an Artificial Intelligence (AI) engine to identify at least one of (i) one or more dynamic rules, and (ii) parameters for the one or more dynamic rules or predetermined rules. The identified and predetermined rules are for authenticating the resource exchange event. Further, at least one of (i) the one or more dynamic rules, and (ii) the parameters for the one or more dynamic rules or predetermined rules are based on the current location of the card device or wearable device. In response to identifying the rules and/or parameters, the instructions are further configured to determine whether the at least one of the one or more dynamic rules and the predetermined rules have been met, and, in response to determining that the at least one of the one or more dynamic rules and the predetermined rules have been met, authenticate the resource exchange event.

In specific embodiments of the system, the short-range wireless communication component is a passive Radio Frequency Identification (RFID) tag, while in other embodiments of the system, the short-range wireless communication component is an active RFID tag. In other related embodiments of the invention, the short-range wireless communication component is a wireless sensor node, which is configured to transmit Zigbee®, Bluetooth®, Bluetooth® Low Energy (BLE) signals or the like.

In other specific embodiments of the system, the card device or wearable device further includes memory configured to store resource exchange event credentials associated with the user. In such embodiments of the system, the resource exchange event authentication instructions are configured to receive the first signal in response to reading the resource exchange event credentials from the memory of the card device or wearable device.

In still further specific embodiments of the system, at least one of the one or more dynamic rules or at least one of the predetermined rules are based on comparing the current location of the card device or wearable device to a current location of a mobile communication device in possession of a second user (e.g., a mobile device of a third-party, such as a guardian or the like). In related embodiments of the system, the resource exchange event authentication instructions are further configured to, in response to determining that the at least one of the one or more dynamic rules or the at least one of the predetermined rules based on comparing the current location of the card device or wearable device to the current location of a mobile communication device in possession of a second user has not been met, generate, and initiate communication of, a notification to the second user that identifies the user and the resource exchange event and requests that the second user approve or deny the resource exchange event.

In further specific embodiments of the system, the predetermined rules are defined by a second user (e.g., a third-party guardian or the like).

In still further specific embodiments of the system at least one of the one or more dynamic rules or at least one of the predetermined rules are based on at least one of (i) a time of the resource exchange event, (ii) a volume of resources required on the resource exchange event, and (iii) a type of object or service being exchanged in the resource exchange event.

Moreover, in further specific embodiments of the system, at least one of the one or more dynamic rules are dynamically identified, on-the-fly, based at least on one of historical (i) predefined rules associated with the user, and (ii) dynamically dynamic rules associated with the user.

A computer-implemented method for authenticating a resource exchange event defines second embodiments of the invention. The computer-implemented method is executed by one or more computing processor devices. The method includes receiving a first signal that requests processing of a resource exchange event initiated by the user and determining a current location of a card device or wearable device in possession of the user based on signals transmitted by a short-range wireless device included in a card device or wearable device in possession of the user. The method further includes implementing Artificial Intelligence techniques to identify at least one of (i) one or more dynamic rules, and (ii) parameters for the one or more dynamic rules or predetermined rules. The identified and predetermined rules are for authenticating the resource exchange event. Further, at least one of (i) the one or more dynamic rules, and (ii) the parameters for the one or more dynamic rules or predetermined rules are based on the current location of the card device or wearable device. In addition, the method includes determining whether the at least one of the one or more dynamic rules and the predetermined rules have been met, and, in response to determining that the at least one of the one or more dynamic rules and the predetermined rules have been met, authenticating the resource exchange event.

In specific embodiments of the method, receiving the first signal that requests processing of the resource exchange event initiated by the user further includes receiving the first signal in response to reading resource exchange event credentials associated with the user from memory stored within the card device or wearable device.

In other specific embodiments of the method, implementing the AI engine to identify further comprises implementing the AI engine to identify at least one of (i) one or more dynamic rules, and (ii) parameters for the one or more dynamic rules or predetermined rules, such that, at least one of the one or more dynamic rules or at least one of the predetermined rules are based on comparing the current location of the card device or wearable device to a current location of a mobile communication device in possession of a second user. In related embodiments the method further includes, in response to determining that the at least one of the one or more dynamic rules or at least one of the predetermined rules based on comparing the current location of the card device or wearable device to the current location of a mobile communication device in possession of a second user has not been met, generating, and initiating communication of, a notification to the second user that identifies the user and the resource exchange event and requests that the second user approve or deny the resource exchange event.

In other specific embodiments of the method, implementing the AI engine to identify further includes implementing the AI engine to identify at least one of (i) one or more dynamic rules, and (ii) parameters for the one or more dynamic rules or predetermined rules, such that, the predetermined rules are defined by a second user.

A computer program product including a non-transitory computer-readable medium defines third embodiments of the invention. The computer-readable medium includes a first set of codes for causing a computer to receive a first signal that requests processing of a resource exchange event initiated by the user. Additionally, the computer-readable medium includes a second set of codes for causing a computer to determine a current location of a card device or wearable device in possession of the user based on signals transmitted by a short-range wireless device included in a card device or wearable device in possession of the user. Further, the computer-readable medium includes a third set of codes for causing a computer to implement Artificial Intelligence techniques to identify at least one of (i) one or more dynamic rules, and (ii) parameters for the one or more dynamic rules or predetermined rules, wherein the identified and predetermined rules are for authenticating the resource exchange event, and at least one of (i) the one or more dynamic rules, and (ii) the parameters for the one or more dynamic rules or predetermined rules are based on the current location of the card device or wearable device. In addition, the computer-readable medium includes a fourth set of codes for caucusing a computer to determine whether the at least one of the one or more dynamic rules and the predetermined rules have been met, and a fifth set of codes for causing a computer to, in response to determining that the at least one of the one or more dynamic rules and the predetermined rules have been met, authenticating the resource exchange event.

In specific embodiments of the computer program product, the first set of codes are further configured to cause the computer to receive the first signal in response to reading resource exchange event credentials associated with the user from memory stored in the card device or wearable device.

In other specific embodiments of the computer program product, the third set of codes are further configured to cause the computer to implement the AI engine to identify at least one of (i) one or more dynamic rules, and (ii) parameters for the one or more dynamic rules or predetermined rules, such that at least one of the one or more dynamic rules or at least one of the predetermined rules are based on comparing the current location of the card device or wearable device to a current location of a mobile communication device in possession of a second user.

In other specific embodiments of the computer program product, the computer-readable medium further comprises a sixth set of codes for causing a computer to, in response to determining that the least one of the one or more dynamic rules or the at least one of the predetermined rules based on comparing the current location of the card device or wearable device to the current location of a mobile communication device in possession of a second user has not been met, generate, and initiate communication of, a notification to the second user that identifies the user and the resource exchange event and requests that the second user approve or deny the resource exchange event.

Moreover, in additional specific embodiments of the computer program product, the third set of codes are further configured to cause the computer to implement the AI engine to identify at least one of (i) one or more dynamic rules, and (ii) parameters for the one or more dynamic rules or predetermined rules, such that at least one of the one or more dynamic rules are dynamically identified based at least one of historical (i) predefined rules associated with the user, and (ii) dynamically dynamic rules associated with the user.

Thus, according to embodiments of the invention, which will be discussed in greater detail below, the present invention provides for highly secure and simplistic means for resource exchange event authentication. The authentication procedure is predicated on user location that is determined from short-range wireless signals transmitted from a card or wearable device in possession of the user. Additionally, Artificial Intelligence (AI), including Machine Learning (ML) techniques are relied on to determine at least one of an authentication rule or parameters for an authentication rule as part of the authentication process. In this regard, authentication rules or parameters (e.g., thresholds or the like), which may be based not only on the aforementioned determined location of the user, but also on other factors such as time, amount of resource exchange event, type of objects/services being exchanged in the event and the like, may be determined intelligently and dynamically at the time that the resource exchange event occurs.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for a highly secure and simplistic means for resource exchange event authentication. The authentication is predicated on user location that is determined from short-range wireless signals transmitted from a card or wearable device in possession of the user. As such the card or wearable device (e.g., bracelet or the like) is equipped with one or more short-range wireless components, such as Radio Frequency Identification (RFID) tags, Zigbee®, Bluetooth®, Bluetooth® Low Energy (BLE) components or the like. In this regard, the card or wearable device is not required to have Intranet or cellular network capabilities, as would be the case if the location were determined using GPS signals. Furthermore, since at least some of the contemplated embodiments envision a card or wearable device with limited battery functionality, the device will be relatively low cost. Moreover, the card device or wearable device may include a memory that stores the user's resource exchange event credentials, such that the card device or wearable device additionally serves as the instrument for initiating the resource exchange event.

Specific use cases center around the user being a minor or some other individual that does not possess a smart phone or other device with Intranet or cellular capabilities. In such embodiments of the invention, the authentication of the resource exchange event may be at least partially based on the user's location (e.g., minor's location or the like) being within a predetermined or dynamically determined range of a third-party entity's location (e.g., guardian/parent's location or the like). If the user is determined to be outside of the predetermined or dynamically determined range, the system is configured to generate and communicate an alert to the third-party entity (e.g., guardian/parent's location or the like), which notifies the third-party of details associated with the user's pending resource exchange event and provides the third-party the ability to approve/authenticate or deny the resource exchange event.

Moreover, embodiments of the present invention rely on Artificial Intelligence (AI), including Machine Learning (ML) techniques to determine at least one of an authentication rule or parameters for an authentication rule as part of the authentication process. In this regard, authentication rules or parameters (e.g., thresholds or the like), which may be based not only on the location of the user, but also on other factors such as time, amount of resource exchange event, type of objects/services being exchanged in the event and the like, may be determined intelligently and dynamically at the time that the resource exchange event occurs. The AI/ML may rely on (i) historical rules that were either defined by the user, defined by a third-party associated with the user (e.g., guardian or the like) or determined by the AI for previous resource exchange events conducted by the user, and (ii) other temporal factors that may affect resource exchange event authentication.

Figure 1:
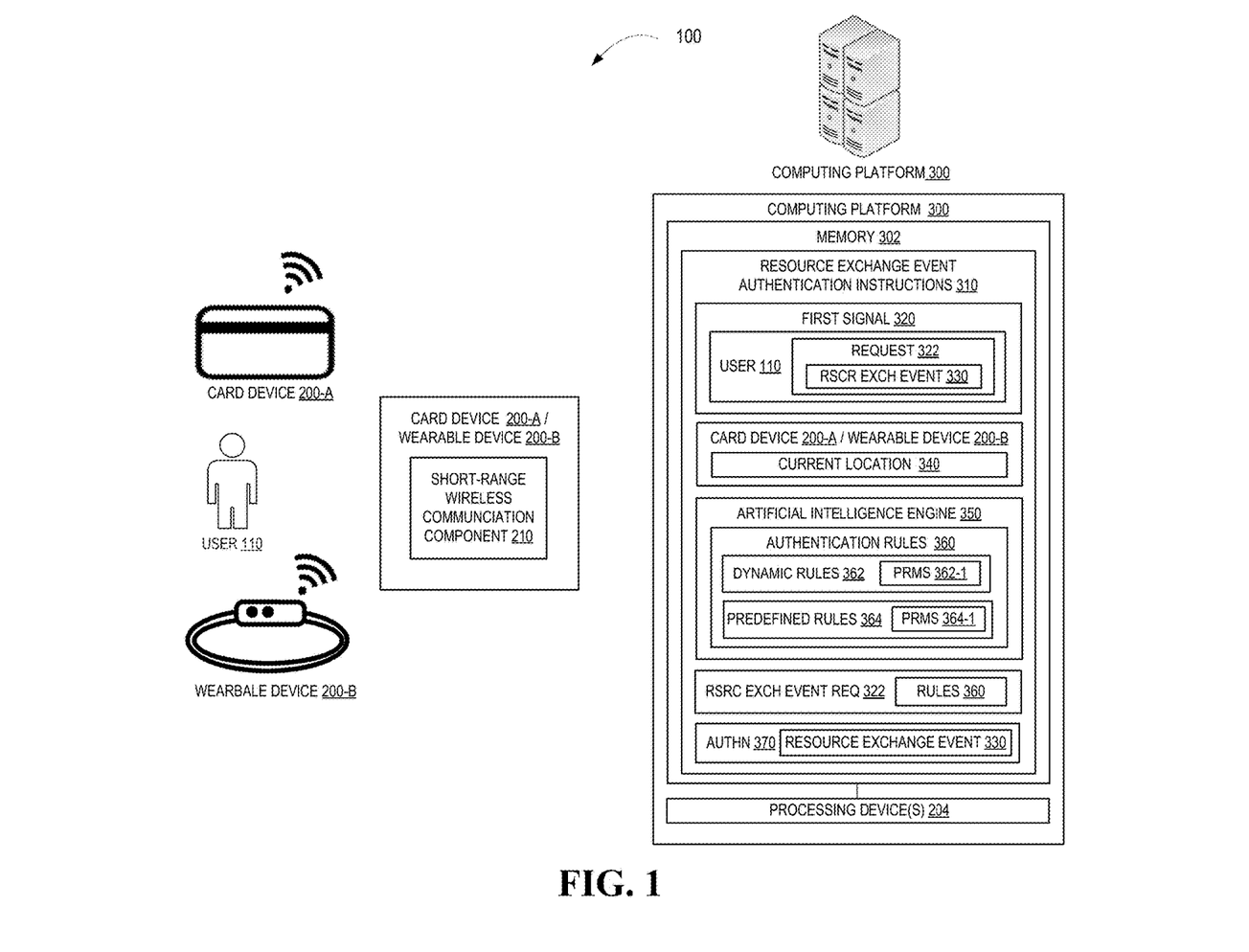
FIG. 1 is a schematic/block diagram of a system for resource exchange event authentication, in accordance with embodiments of the present invention.

Referring to FIG. 1, shown is a system 100 for resource exchange event authentication, in accordance with embodiments of the present invention. System 100 includes a card device 200-A or a wearable device 200-B (such as a bracelet device or the like) that is in possession of a user 110. Card device 200-A and wearable device 200-B include a short-range wireless communication component 210 that is configured to transmit signals for determining a location of the corresponding card device or wearable (ostensibly, the location of the user, since user is in possession the card device or wearing the wearable device).

System 100 additionally includes computing platform 300 having memory 302 and one or more processing devices 304 in communication with memory 302. Memory 302 stores resource exchange event authentication instructions 310 that are executable by at least one of the one or more processing devices 304. Resource exchange event authentication instructions 310 are configured to receive a first signal 320 that requests 322 processing of a resource exchange event 330 initiated by user 110. In specific embodiments of the invention, resource exchange event includes a payment event or transaction in which the user submits payment (i.e., resources) in exchange for objects/goods and/or services.

In response to receiving the first signal 320 or in close proximity to the time at which the first signal 320 is received, resource exchange event authentication instructions 310 are configured to determine/identify a current location 340 of the card device 200-A or wearable device 200-B based on the signals transmitted by the short-range wireless communication component 210.

Further, in response to receiving the first signal 320, resource exchange event authentication instructions 310 are configured to implement an Artificial Intelligence (AI) engine 350, typically including Machine Learning (ML) techniques to identify at least of (i) one or more dynamic rules 362, and (ii) parameters 362-1 pertaining to the dynamic rules or parameters 364-1 pertaining to predefined rules 364. The identified dynamic rules 362 and the predefined rules 364, collectively authentication rules 360, are for authenticating the resource exchange event 330. At least one of (i) the identified dynamic rules 362, and (ii) the predefined rules 364 rely on the current location 340 of the card device 200-A or wearable device 200-B.

In response to identifying the dynamic rule(s) 362 and/or parameters 362-1, 364-1 for the dynamic rule(s) 362 and/or predefined rule(s) 364, resource exchange event authentication instructions 310 are configured to determine whether dynamic rule(s) 362 and/or predefined rule(s) 364 have been met by applying the location 340 of the card device 200-A or wearable device 200-B and, in some embodiments, details of the resource exchange event 330 to the rules 362 and/or 364. In response to determining that the dynamic rule(s) 362 and/or predefined rule(s) 364 have been met, resource exchange event authentication instructions 310 are configured to authenticate 370 (i.e., approve) the resource exchange event 330 for further processing.

Figure 2:
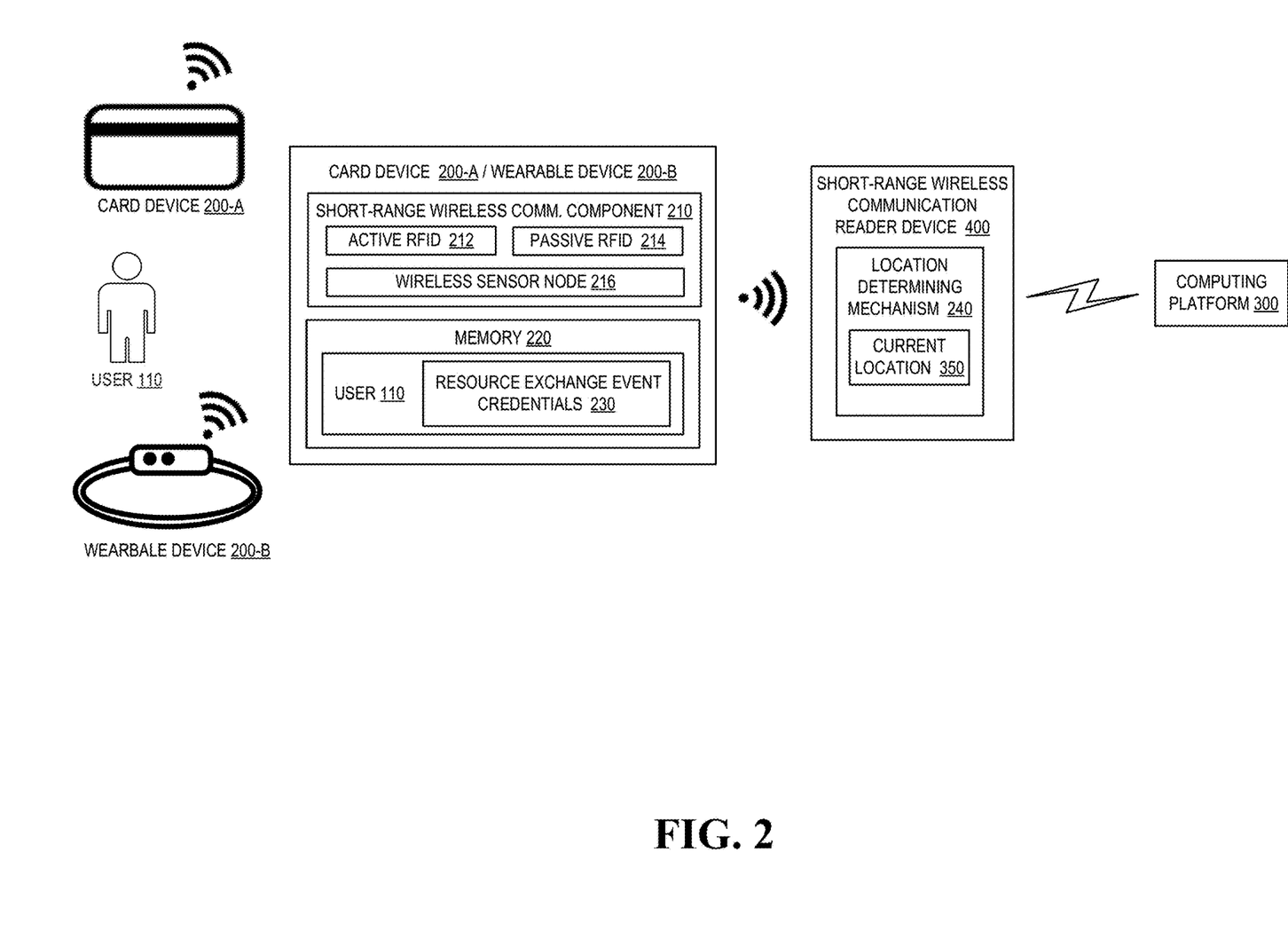
FIG. 2 is a schematic/block diagram of a card device and wearable device used for location determination in a system for resource exchange event authentication, in accordance with some embodiments of the present disclosure.

Referring to FIG. 2, shown is schematic/block diagram of a card device 200-A and wearable device 200B used for location determination in a system for resource exchange event authentication, in accordance with embodiments of the present invention. As previously discussed, the card device 200-A and wearable device 200B include a short-range wireless communication component 210 that is configured to transmit signals for determining a location of the corresponding card device or wearable. In specific embodiments of the invention, short-range wireless communication component 210 is an active Radio Frequency Identification (RFID) tag 212, such tags, otherwise referred to as "beacons" require battery power in order for the signals to be transmitted. Thus, in those embodiments of the invention in which short-range wireless communication component 210 comprises an active RFID tag 212, the card device 200-A or wearable device 200-B additionally comprises a battery device, which may be rechargeable or non-rechargeable. In other specific embodiments of the invention, short-range wireless communication component 210 is a passive Radio Frequency Identification (RFID) tag 214, which require no internal power source and instead are powered by the electromagnetic energy transmitted from an RFID reader. Thus, in such embodiments of the invention, the card device 200-A or wearable device 200-B may be battery-less.

In other specific embodiments of the invention, short-range wireless communication component 210 is a wireless sensor node configured to communicate via a wireless sensor network (WSN), which may communicate via Zigbee®, Bluetooth® (from 2.402 GHz to 2.48 GHz communication band) or Bluetooth Low Energy (BLE).

In optional embodiments of the invention, card device 200-A or wearable device 200-B additionally includes a memory 220, which may a magnetic strip, a smart chip or the like, which stores resource exchange event credentials 230 associated with the user 110. Thus, in such embodiments of the invention, the card device 220-A and wearable 220-B not only serve as the mechanism for location-determination but also serve as the means by which the resource exchange event is initiated (i.e., prompts first signal 320 to be communicated to the resource exchange event authentication instructions 310 of computing platform 300).

In specific embodiments of the invention the short-range wireless signals transmitted from the card device 200-A or wearable device 200-B are received by short-range wireless communication reader device 400, which may be incorporated within or located in close proximity to a resource exchange event processing device, such as a point-of-sale device. While in other embodiments of the invention, short-range wireless communication reader device 400 may be part of a separate tracking system used to track the location of the card device and wearable device, such as a tracking system implemented within the confines of a designated area. Short-range wireless communication reader device 400 includes location determining mechanism 240 which is configured to receive the signals transmitted from short-range wireless communication component 210 of the card device 200-A or wearable device 200-B and determine the current location 340 of the card device 200-A or wearable device 200-B. In response determining the current location 340 of the card device 200-A or wearable device 200-B, short-range wireless communication reader device 400 is configured to communicate the current location 340 to computing platform 300 and, specifically, resource exchange event authentication instructions 310.

Figure 3:
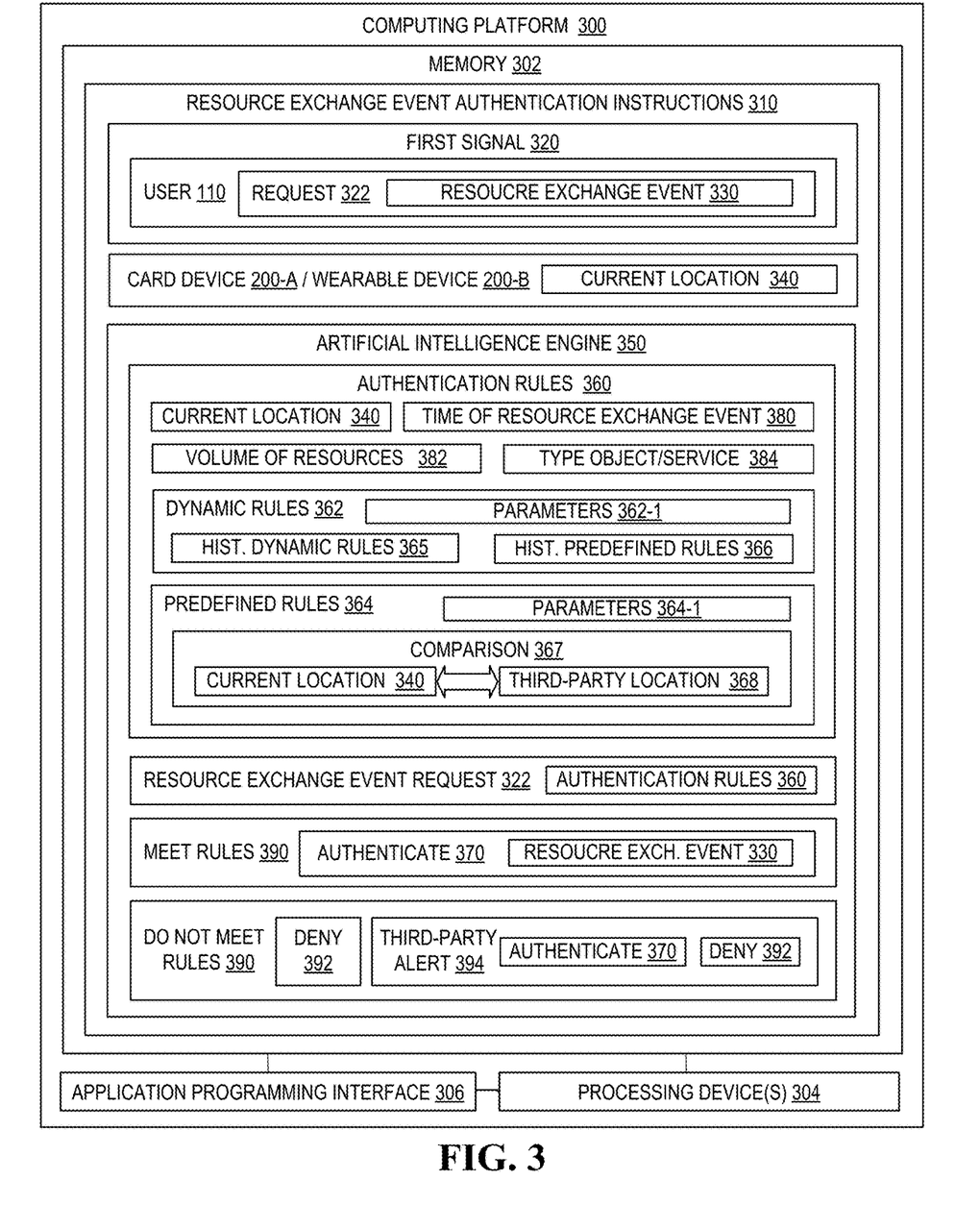
FIG. 3 is a block diagram of a computing device including resource exchange event authentication instructions, in accordance with some embodiments of the present disclosure.

Referring to FIG. 3, a block diagram is presented of computing platform 200 configured for resource exchange event authentication, in accordance with embodiments of the present invention. In addition to providing greater details of the computing platform 300, FIG. 3 highlights various alternate embodiments of the invention. Computing platform 300 may comprise one or multiple devices, such as servers or the like. Computing platform 300 includes memory 302, which may comprise volatile and/or non-volatile memory, such as read-only and/or random-access memory (RAM and ROM), EPROM, EEPROM, flash cards, or any memory common to computing platforms). Moreover, memory 302 may comprise cloud storage, such as provided by a cloud storage service and/or a cloud connection service.

Further, computing platform 300 includes one or more processing devices 304, which may be an application-specific integrated circuit ("ASIC"), or other chipset, logic circuit, or other data processing device. Processing device(s) 304 may execute one or more application programming interface (APIs) 306 that interface with any resident programs, such as resource exchange event authentication instructions 310 or the like, stored in memory 302 of computing platform 300 and any external programs. Processing devices(s) 304 may include various processing subsystems (not shown in FIG. 3) embodied in hardware, firmware, software, and combinations thereof, that enable the functionality of computing platform 300 and the operability of computing platform 300 on a network, such as the Intranet, intranet(s), cellular network(s) and the like. For example, processing subsystems allow for initiating and maintaining communications and exchanging data with other networked devices. For the disclosed aspects, processing subsystems of computing platform 300 may include any subsystem used in conjunction with resource exchange event authentication instructions 310 and related tools, routines, sub-routines, algorithms, sub-algorithms, sub-modules thereof.

In specific embodiments of the present invention, computing platform 300 may additionally include a communications module (not shown in FIG. 3) embodied in hardware, firmware, software, and combinations thereof, that enables electronic communications between the computing platform 300 and other networks and network devices. Thus, communication module may include the requisite hardware, firmware, software and/or combinations thereof for establishing and maintaining a network communication connection with one or more devices and/or networks.

Memory 302 of computing platform 300 stores resource exchange event authentication instructions 310. As previously discussed in relation to FIG. 1, resource exchange event authentication instructions 310 are configured to receive a first signal 320 that includes a request 322 for processing a resource exchange event 330 initiated by a user 110. In specific embodiments of the invention, the resource exchange event 330 is a transaction, such as a payment transaction initiated by the user in which the user exchanges resources (i.e., payment) for object(s)/good(s) or service(s). In response to receiving the first signal 320 or proximate in time to receiving the first signal 320, resource exchange event authentication instructions 310 are configured to determine a current location 340 of a card device 200-A or wearable device 200-B in possession of user 110. In specific embodiments of the invention, resource exchange event authentication instructions 310 may determine the current location 340 of the card device 200-A or wearable device 200-B, while in other embodiments of the invention, the current location may be determined by other instructions (e.g., location determining mechanism 240 shown in FIG. 2) and received by the resource exchange event authentication instructions 310.

Further, in response to receiving the first signal 320, resource exchange event authentication instructions 310 are configured to implement an Artificial Intelligence (AI) engine 350, typically including Machine Learning (ML) techniques to identify at least of (i) one or more dynamic rules 362, and (ii) parameters 362-1 pertaining to the dynamic rules or parameters 364-1 pertaining to predefined rules 364. The identified dynamic rules 362 and the predefined rules 364, collectively authentication rules 360, are for authenticating the resource exchange event 330. The parameters 362-1, 364-1 may be thresholds or boundaries associated with a corresponding a rule or the like. At least one of (i) the identified dynamic rules 362, and (ii) the predefined rules 364 rely on the current location 340 of the card device 200-A or wearable device 200-B. Other dynamic rules 362 and/or predefined rules may rely on or otherwise be based on the time 380 of the resource exchange event 330, the volume of resources 382 being exchanged in the resource exchange event 330, the type or specific object or service 384 being obtained in the resource exchange event 330 and the like.

In specific embodiments of the invention, a predefined authentication rule 364 may be based on a comparison 367 of the current location 340 of the of the card device 200-A or wearable device 200-B (i.e., user 110) and a third-party location 368 (i.e., a location of a guardian/parent or the like), which may be a geolocation determined by GPS signals or like transmitted from the third-party's mobile communication device or the like. For example, the predefined authentication rule 364 may provide for the resource exchange event 330 to be authenticated if the current location 340 of the of the card device 200-A or wearable device 200-B (i.e., user 110) is within a predefined distance of the third-party location 368. In other specific embodiments of the invention, a predefined authentication rule 364 may be based on the current location 340 of the of the card device 200-A or wearable device 200-B (i.e., user 110) being within a predefined location area, such as a geolocation area or the like.

In response to identifying the dynamic rule(s) 362 and/or parameters 362-1, 364-1 for the dynamic rule(s) 362 and/or predefined rule(s) 364, resource exchange event authentication instructions 310 are configured to determine whether dynamic rule(s) 362 and/or predefined rule(s) 364 have been met by applying the location 340 of the card device 200-A or wearable device 200-B and, in some embodiments, details of the resource exchange event 330 (e.g., volume of resources, time of event, objects/services in the event and the like) to the rules 362 and/or 364.

In response to determining that the dynamic rule(s) 362 and/or predefined rule(s) 364 have been met, resource exchange event authentication instructions 310 are configured to authenticate 370 (i.e., approve) the resource exchange event 330 for further processing. In response to determining that the dynamic rule(s) 362 and/or predefined rule(s) 364 have not been met, the resource exchange event 330 may be denied 392 or other actions may be taken. In specific embodiments of invention, such as when an authentication rule 360 requires comparison 367 between the current location 340 of the of the card device 200-A or wearable device 200-B (i.e., user 110) and a third-party location 368, the other action may be generating and initiating communication of an alert 394 to the third-party that notifies the third-party that the user 110 is attempting to initiate a resource exchange event and, in some embodiments provides, details associated with the resource exchange event 330 (e.g., volume of resources, object(s)/service(s) and the like). In further specific embodiments of the invention, the third-party alert 394 is configured with hyperlinks that allow for the third-party to choose between authenticating 370 the resource exchange event 330 and denying 392 the resource exchange event 330.

Figure 4:
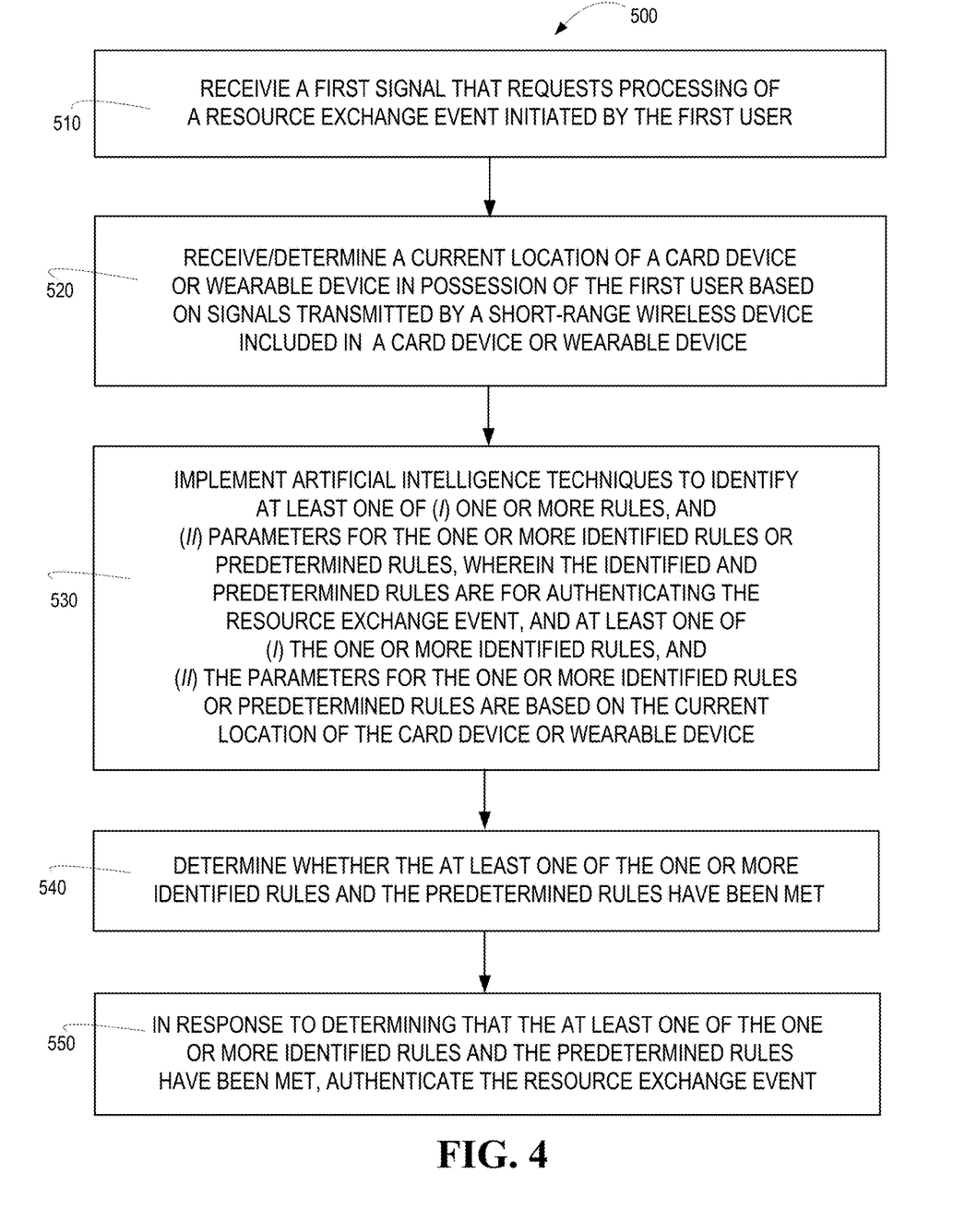
FIG. 4 is a flow diagram of a computer-implemented method for resource exchange event authentication, in accordance with embodiments of the present invention.

Referring to FIG. 4, a flow diagram is depicted of a method 500 for resource exchange event authentication, in accordance with embodiments of the present invention. At Event 510, a first signal is received that requests processing of a resource exchange event that has been initiated by a user. In specific embodiments of the invention, the resource exchange event is a payment transaction and, in other or the same embodiments of the invention, the user is a minor or other individual under a guardianship (e.g., elderly individual or the like).

In response to receiving the first signal or proximate in time to receiving the first signal, at Event 520, a current location of a card device or wearable device in possession of the user is determined or received. The location being determined based of short-range wireless communication signals transmitted by a mechanism within the card device or the wearable device.

In response to determining/receiving the location the card device or wearable device, at Event 530, AI and, in some embodiments ML techniques, are implemented to identify (i) dynamic authentication rules and/or (ii) parameters associated with (a) the dynamic authentication rules and/or (b) predefined authentication rules. The dynamic authentication rules and predefined authentication rules are for authenticating the resource exchange event. At least one of the dynamic authentication rules, and/or one of the predefined authentication rules rely on or are based on the current location of the card device or wearable device. In further embodiments the dynamic authentication rules, and/or one of the predefined authentication rules are based on other factors, such as time of the resource exchange event, volume of resources being exchanged in the resource exchange event, object(s)/service(s) being obtained in the resource exchange event and the like.

In response to identify the authentication rules and/or parameters for the authentication rules, at Event 540, a determination is made as to whether the authentication rules (i.e., one or more dynamic authentication rules and/or one or more predefined authentication rules) have been met. In this regard, the current location of the card device or wearable device and other factors defined in the request, such as time, volume of resources, object(s)/service(s) and the like are applied to the authentication rules.

In response to determining that the authentication rules have been met, at Event 550, the resource exchange event is authenticated (i.e., approved for further processing). In alternate embodiments of the method, in response to determining that the authentication rules have not been met, the resource exchange event is denied or further action(s) are taken, such as communicating an alert to a third-party that notifies the third-party of the pending resource exchange event and requests that the third-party provide an input that authenticates or denies the resource exchange event.

Thus, present embodiments of the invention provide devices, methods, computer program products and/or the like for resource exchange event authentication. The authentication procedure is predicated on user location that is determined from short-range wireless signals transmitted from a card or wearable device in possession of the user. Artificial Intelligence (AI), including Machine Learning (ML) techniques are relied on to determine authentication rule(s) and/or parameters for an authentication rule as part of the authentication process. As a result of the invention, authentication rules and/or parameters, which may be based not only on the aforementioned determined location of the user, but also on other factors such as time, amount of resource exchange event, type of objects/services being exchanged in the event and the like, are determined intelligently and dynamically at the time that the resource exchange event occurs.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authenticating a resource exchange event, the system comprising:
  a card device or wearable device in possession of a user and including a short-range wireless communication component configured to transmit signals for determining a location of the card device or wearable device;
  a computing platform having a memory and one or more computing processor devices in communication with the memory, wherein the memory stores resource exchange event authentication instructions that are executable by at least one of the one or more computing processing devices and configured to:
    receive a first signal that requests processing of a resource exchange event initiated by the user,
    in response to receiving the first signal that requests processing of the resource exchange event, determine that the user has used the card device or wearable device to initiate the processing of the resource exchange event,
    in response to determining that the user has used the card device or wearable device to initiate the processing of the resource exchange event, determine a current location of the card device or wearable device based on the signals transmitted by the short-range wireless communication component,
    in response to determining the current location of the card device or wearable device, implement an Artificial Intelligence (AI) engine to identify (i) one or more dynamic rules, and (ii) parameters for the one or more dynamic rules or predetermined rules, wherein the dynamic rules and predetermined rules are for authenticating the resource exchange event, and (i) the one or more dynamic rules, and (ii) the predetermined rules rely on the current location of the card device or wearable device,
    determine whether the at least one of the one or more dynamic rules and the predetermined rules have been met, and
    in response to determining that the at least one of the one or more dynamic rules and the predetermined rules have been met, authenticate the resource exchange event.

2. The system of claim 1, wherein the short-range wireless communication component is a passive Radio Frequency Identification (RFID) tag.

3. The system of claim 1, wherein the short-range wireless communication component short-range wireless communication component is an active Radio Frequency Identification (RFID) tag.

4. The system of claim 1, wherein the short-range wireless communication component is a wireless sensor node.

5. The system of claim 1, wherein the card device or wearable device further include memory configured to store resource exchange event credentials associated with the user.

6. The system of claim 5, wherein the resource exchange event authentication instructions are configured to receive the first signal, wherein the first signal is received in response to reading the resource exchange event credentials from the memory of the card device or wearable device.

7. The system of claim 6, wherein the resource exchange event authentication instructions are further configured to, in response to determining that the at least one of the one or more dynamic rules or the at least one of the predetermined rules based on comparing the current location of the card device or wearable device to the current location of a mobile communication device in possession of a second user has not been met, generate, and initiate communication of, a notification to the second user that identifies the user and the resource exchange event and requests that the second user approve or deny the resource exchange event.

8. The system of claim 1, wherein the resource exchange event authentication instructions are configured to implement the AI engine to identify at least one of (i) one or more dynamic rules, and (ii) parameters for the one or more dynamic rules or predetermined rules, wherein at least one of the one or more dynamic rules or at least one of the predetermined rules are based on comparing the current location of the card device or wearable device to a current location of a mobile communication device in possession of a second user.

9. The system of claim 1, wherein the resource exchange event authentication instructions are configured to implement the AI engine to identify at least one of (i) one or more dynamic rules, and (ii) parameters for the one or more dynamic rules or predetermined rules, wherein the predetermined rules are defined by a second user.

10. The system of claim 1, wherein the resource exchange event authentication instructions are configured to implement the AI engine to identify at least one of (i) one or more dynamic rules, and (ii) parameters for the one or more dynamic rules or predetermined rules, wherein at least one of the one or more dynamic rules or at least one of the predetermined rules are based on at least one of (i) a time of the resource exchange event, (ii) a volume of resources required on the resource exchange event, and (iii) a type of object or service being exchanged in the resource exchange event.

11. The system of claim 1, wherein the resource exchange event authentication instructions are configured to implement the AI engine to identify at least one of (i) one or more dynamic rules, and (ii) parameters for the one or more dynamic rules or predetermined rules, wherein at least one of the one or more dynamic rules are dynamically identified based at least on one of historical (i) predefined rules associated with the user, and (ii) dynamically dynamic rules associated with the user.

12. A computer-implemented method for authenticating a resource exchange event, the computer-implemented method is executed by one or more computing processor devices and comprises:
   receiving a first signal that requests processing of a resource exchange event initiated by the user;
   in response to receiving the first signal that requests processing of the resource exchange event, determining that the user has used the card device or wearable device to initiate the processing of the resource exchange event,
   in response to determining that the user has used the card device or wearable device to initiate the processing of the resource exchange event, determining a current location of a card device or wearable device in possession of the user-based on signals transmitted by a short-range wireless device included in a card device or wearable device in possession of the user;
   in response to determining the current location of the card device or wearable device, implementing Artificial Intelligence (AI) techniques to identify (i) one or more dynamic rules, and (ii) parameters for the one or more dynamic rules or predetermined rules, wherein the identified and predetermined rules are for authenticating the resource exchange event, and (i) the one or more dynamic rules, and (ii) the predetermined rules are based on the current location of the card device or wearable device;
   determining whether the at least one of the one or more dynamic rules and the predetermined rules have been met; and
   in response to determining that the at least one of the one or more dynamic rules and the predetermined rules have been met, authenticating the resource exchange event.

13. The computer-implemented method of claim 12, wherein receiving the first signal that requests processing of the resource exchange event initiated by the user further comprises receiving the first signal in response to reading resource exchange event credentials associated with the user from memory stored within the card device or wearable device.

14. The computer-implemented method of claim 12, wherein implementing the AI techniques to identify further comprises implementing the AI techniques to identify at least one of (i) one or more dynamic rules, and (ii) parameters for the one or more dynamic rules or predetermined rules, wherein at least one of the one or more dynamic rules or at least one of the predetermined rules are based on comparing the current location of the card device or wearable device to a current location of a mobile communication device in possession of a second user.

15. The computer-implemented method of claim 12, further comprising, in response to determining that the at least one of the one or more dynamic rules or at least one of the predetermined rules based on comparing the current location of the card device or wearable device to the current location of a mobile communication device in possession of a second user has not been met, generating, and initiating communication of, a notification to the second user that identifies the user and the resource exchange event and requests that the second user approve or deny the resource exchange event.

16. A computer program product comprising:
   a non-transitory computer-readable medium comprising:
   a first set of codes for causing a computer to receive a first signal that requests processing of a resource exchange event initiated by the user;
   a second set of codes for causing a computer to, in response to receiving the first signal that requests processing of the resource exchange event, determine that the user has used the card device or wearable device to initiate the processing of the resource exchange event,
   a third set of codes for causing a computer to, in response to determining that the user has used the card device or wearable device to initiate the processing of the resource exchange event, determine a current location of a card device or wearable device in possession of the user based on signals transmitted by a short-range wireless device included in a card device or wearable device in possession of the user;
   a fourth set of codes for causing a computer to, in response to determining the current location of the card device or wearable device, implement Artificial Intelligence (AI) techniques to identify (i) one or more dynamic rules, and (ii) parameters for the one or more dynamic rules or predetermined rules, wherein the identified and predetermined rules are for authenticating the resource exchange event, and (i) the one or more dynamic rules, and (ii) the predetermined rules are based on the current location of the card device or wearable device;
   a fifth set of codes for causing a computer to determine whether the at least one of the one or more dynamic rules and the predetermined rules have been met; and
   a sixth set of codes for causing a computer to, in response to determining that the at least one of the one or more dynamic rules and the predetermined rules have been met, authenticating the resource exchange event.

17. The computer program product of claim 16, wherein the first set of codes are further configured to cause the computer to receive the first signal in response to reading resource exchange event credentials associated with the user from memory stored in the card device or wearable device.

18. The computer program product of claim 16, wherein the fourth set of codes are further configured to cause the computer to implement the AI techniques to identify at least one of (i) one or more dynamic rules, and (ii) parameters for the one or more dynamic rules or predetermined rules, wherein at least one of the one or more dynamic rules or at least one of the predetermined rules are based on comparing the current location of the card device or wearable device to a current location of a mobile communication device in possession of a second user.

19. The computer program product of 18, wherein the computer-readable medium further comprises a seventh set of codes for causing a computer to, in response to determining that the least one of the one or more dynamic rules or the at least one of the predetermined rules based on comparing the current location of the card device or wearable device to the current location of a mobile communication device in possession of a second user has not been met, generate, and initiate communication of, a notification to the second user that identifies the user and the resource exchange event and requests that the second user approve or deny the resource exchange event.

20. The computer program product of claim 16, wherein the fourth set of codes are further configured to cause the computer to implement the AI techniques to identify at least one of (i) one or more dynamic rules, and (ii) parameters for the one or more dynamic rules or predetermined rules, wherein at least one of the one or more dynamic rules are dynamically identified based at least one of historical (i) predefined rules associated with the user, and (ii) dynamically dynamic rules associated with the user.

* * * * *